US009637012B2

(12) United States Patent
Biagini

(10) Patent No.: US 9,637,012 B2
(45) Date of Patent: May 2, 2017

(54) CHARGING DEVICE HAVING ADAPTIVE INPUT

(71) Applicant: INTELLIGENT ELECTRONIC SYSTEMS, Saint-Aunes (FR)

(72) Inventor: Eric Biagini, Perols (FR)

(73) Assignee: INTELLIGENT ELECTRONIC SYSTEMS, Montpellier (FR)

(*) Notice: Subject to any disclaimer, the term of this patent is extended or adjusted under 35 U.S.C. 154(b) by 128 days.

(21) Appl. No.: 14/400,102

(22) PCT Filed: Jun. 7, 2013

(86) PCT No.: PCT/FR2013/051312
§ 371 (c)(1),
(2) Date: Nov. 10, 2014

(87) PCT Pub. No.: WO2013/182825
PCT Pub. Date: Dec. 12, 2013

(65) Prior Publication Data
US 2015/0115888 A1   Apr. 30, 2015

(30) Foreign Application Priority Data

Jun. 7, 2012  (FR) .................................... 12 01646

(51) Int. Cl.
*H02J 7/00*   (2006.01)
*B60L 11/18*   (2006.01)
(Continued)

(52) U.S. Cl.
CPC ....... *B60L 11/1811* (2013.01); *B60L 11/1812* (2013.01); *B60L 11/1838* (2013.01);
(Continued)

(58) Field of Classification Search
CPC .............. B60L 11/1811; B60L 11/1812; B60L 11/1838; H02J 7/02; H02J 7/04; H02J 7/0055
(Continued)

(56) References Cited

U.S. PATENT DOCUMENTS

2004/0217746 A1* 11/2004 Thiery ................... H02M 1/425
                                                                    323/282
2007/0159141 A1*  7/2007 Shih ........................... G05F 1/70
                                                                    323/207
(Continued)

FOREIGN PATENT DOCUMENTS

CN     201594757        9/2010
CN     202142879        2/2012

OTHER PUBLICATIONS

Su et al: "Current source inverter based traction drive for EV battery charging applications", 2011 IEEE Vehicle Power and Propulsion Conference, 12339364, 2011, pp. 1-6, XP002692761, Pistacaway, NJ, USA DOI: 10.1109/vppc.2011.6043143 ISBN: 978-1-61284-248-6.

*Primary Examiner* — Paul Dinh
(74) *Attorney, Agent, or Firm* — Duane Morris LLP; J. Rodman Steele, Jr.; Gregory M. Lefkowitz

(57) ABSTRACT

The invention relates to a charging device (2) for a battery (5) of a motorized device, suitable for being supplied by a single-phase alternating input current, and suitable for being supplied by a multi-phase alternating input current, said charging device (2) including a first conversion module (3) and a second conversion module (4), the first conversion module (3) being suitable for converting an alternating current into at least one intermediate direct current and of supplying the second conversion module (4) with said intermediate current, and the second conversion module (4) being suitable for converting the intermediate current into a (Continued)

direct output current, and of supplying the battery (5) with said output current; the charging device (2) also including a switching module (7) suitable for switching the first conversion module (3) between a first configuration adapted to a first single-phase alternating input current and a second configuration adapted to a multi-phase alternating input current.

22 Claims, 2 Drawing Sheets

(51) Int. Cl.
  *H02J 7/02* (2016.01)
  *H02J 7/04* (2006.01)

(52) U.S. Cl.
  CPC .......... *H02J 7/0055* (2013.01); *H02J 7/022* (2013.01); *H02J 7/04* (2013.01); *B60L 2210/30* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(58) Field of Classification Search
  USPC .......................................... 320/104, 109, 140
  See application file for complete search history.

(56) References Cited

U.S. PATENT DOCUMENTS

| | | | |
|---|---|---|---|
| 2009/0059625 A1* | 3/2009 | Viitanen | H02M 7/48 363/36 |
| 2011/0001362 A1* | 1/2011 | de Groot | H02M 1/4225 307/80 |
| 2013/0134935 A1* | 5/2013 | Maitra | H02J 7/02 320/109 |
| 2013/0162032 A1 | 6/2013 | Matt | |
| 2013/0322139 A1* | 12/2013 | Lee | H02M 7/68 363/84 |
| 2013/0336031 A1* | 12/2013 | McCune, Jr. | H02M 7/2176 363/80 |

* cited by examiner

CHARGING DEVICE HAVING ADAPTIVE INPUT

CROSS-REFERENCE TO RELATED APPLICATIONS

This application is a §371 national stage entry of International Application No. PCT/FR2013/051312, filed Jun. 7, 2013, which claims priority to French Patent Application No. 12/01646, filed Jun. 7, 2012, the entire contents of which are incorporated herein by reference.

FIELD OF THE INVENTION

The present invention relates to a charging device comprising an isolated AC/DC converter, said charging device being particularly suitable for use as an on-board device in an electric motor vehicle, or even as a (removable) device which is outside the electric motor vehicle.

TECHNICAL BACKGROUND

Many mobile machines use electrical energy and are equipped with batteries, for example electric vehicles, cherry pickers, pallet trucks, etc. These machines generally comprise on-board chargers, i.e. electric battery chargers which are mounted directly on the mobile machines. They can also be used with an external battery charging device.

The main function of these chargers is to recharge batteries using the available electricity on the electrical distribution network. They therefore ensure conversion of alternating current into direct current.

The desired criteria for the chargers, and more particularly for the on-board chargers, are high efficiency, compact design, galvanic isolation, good reliability, safe operation, low emission of electromagnetic disturbances, and a low harmonic factor on the input current.

In order to implement the AC/DC conversion function with galvanic isolation, it is known to use a structure having two converters:
- a first, AC/DC converter referred to as a pre-regulator, which comprises a power factor correction circuit in order to limit the input current harmonics.
- a second, DC/DC converter to ensure the regulation of the charging. This DC/DC converter also provides the galvanic isolation function for safe use.

There are two categories of on-board chargers: the most common category is that of on-board chargers having a single-phase input. Since the vast majority of available electrical installations are single phase, these chargers can easily be connected to a large number of available connection points. However, the available charging power is limited as a result of the limit on the voltage and on the intensity of the input current.

The second category is that of three-phase input chargers, which have a greater charging power. However, since three-phase electrical installations are rare, in particular in the case of individuals, these chargers can only function in especially dedicated electrical installations.

There is therefore a need for a charging device for powering batteries of motor-driven machines (and in particular electric motor vehicles) which can be connected to the greatest possible number of systems for connection to the electrical network and which is capable of charging batteries at high power when said power is available.

SUMMARY OF THE INVENTION

The invention firstly relates to a charging device for a battery of a motor-driven machine which is adapted to be powered by a single-phase input alternating current, and which is adapted to be powered by a multi-phase input alternating current, said charging device comprising:
- a first conversion module;
- a second conversion module;
the first conversion module being adapted to convert an alternating current into at least one direct intermediate current and power the second conversion module with said intermediate current;
the second conversion module being is adapted to convert the intermediate current into a direct output current, and power the battery with said output current;
the charging device further comprising:
- a switching module which is adapted to switch the first conversion module between a first configuration which is adapted to a single-phase input alternating current and a second configuration which is adapted to a multi-phase input alternating current.

According to one embodiment, the multi-phase alternating current is a three-phase alternating current.

According to one embodiment, the device comprises control means which are adapted to detect the single-phase or multi-phase nature of the input alternating current, and control the switching device.

According to one embodiment, the control means are adapted to:
- detect one or more parameters of the input alternating current, preferably selected from a voltage value, an intensity value, a power value, a frequency value, and a combination thereof; and/or
- receive one or more pieces of external information, preferably selected from a radio signal, a carrier-current signal, an electrical signal received via a dedicated conductive line, and a combination thereof; and
- adjust one or more operating parameters of the first conversion module on the basis of the detected parameters of the input alternating current and/or the external information received.

According to one embodiment, the adjusted operating parameters of the first conversion module are selected from a maximum intensity value of the intermediate current and a maximum voltage value of the intermediate current.

According to one embodiment, the device comprises additional control means of the first conversion module which are adapted to adjust the voltage of the intermediate current on the basis of operating parameters of the second conversion module, preferably selected from the voltage and/or the power and/or the intensity of the output current.

According to one embodiment, the first conversion module comprises at least one power factor correction circuit.

According to one embodiment, the first conversion module comprises a plurality of conversion units of the first module, each conversion unit of the first module being adapted to convert a single-phase alternating current into a direct current, and the switching module being adapted, in the second configuration, to separate the multi-phase input alternating current into single-phase alternating currents, and power the conversion units of the first module with said respective single-phase alternating currents.

According to one embodiment, each of the conversion units of the first module is adapted to supply an individual intermediate current, and:
- summation means are adapted to sum the individual intermediate currents in order to supply a total intermediate current powering the second conversion module; or the second conversion module comprises conversion units of the second module, each being powered by an individual intermediate current provided by one of the respective conversion units of the first module.

According to one embodiment, the device can be mounted on the motor-driven machine.

According to one embodiment, the device is adapted to be connected to the motor-driven machine on the outside thereof.

According to one embodiment, the motor-driven machine is a vehicle, preferably a motor vehicle powered by electricity.

The invention also relates to a method for charging a battery of a motor-driven machine, comprising:

supplying a single-phase or multi-phase input alternating current;

switching a first conversion module in a first configuration which is adapted to a single-phase alternating current or in a second configuration which is adapted to a multi-phase alternating current;

converting the input alternating current into at least one direct intermediate current, in the first conversion module;

converting the intermediate current into a direct output current in a second conversion module;

powering the battery using the output current;

According to one embodiment, the multi-phase alternating current is a three-phase alternating current.

According to one embodiment, the method comprises detecting the single-phase or multi-phase nature of the input alternating current, the switching of the first conversion module being carried out on the basis of the detected nature of the input alternating current.

According to one embodiment, the method comprises:

detecting one or more parameters of the input alternating current, preferably selected from a voltage value, an intensity value, a power value, a frequency value, and a combination thereof; and/or receiving one or more pieces of external information, preferably selected from an electromagnetic radiation signal, a carrier-current signal, an electrical signal received via a dedicated conductive line, and a combination thereof; and adjusting one or more parameters of the conversion of the input alternating current into an intermediate current on the basis of the detected parameters of the input alternating current and/or the external information received.

According to one embodiment, the parameters of the conversion of the input alternating current into an intermediate current which are adjusted are selected from a maximum intensity value of the intermediate current and a maximum voltage value of the intermediate current.

According to one embodiment, the method comprises adjusting the voltage of the intermediate current on the basis of parameters of the output current, preferably selected from the voltage and/or the power and/or the intensity of the output current.

According to one embodiment, when the first conversion module is in the second configuration, the multi-phase input alternating current is separated into single-phase alternating currents, and each single-phase alternating current is converted into a direct individual intermediate current.

According to one embodiment, the individual intermediate currents are added together to form a total intermediate current, the total intermediate current being converted into the output current; or each individual intermediate current is converted into a direct individual output current, the individual output currents being added together to form a total output current.

According to one embodiment, the motor-driven machine is a vehicle, preferably a motor vehicle powered by electricity.

The invention also relates to a motor-driven machine comprising the above-described charging device and the battery, the motor-driven machine preferably being a vehicle, and more particularly preferably a motor vehicle powered by electricity.

The present invention makes it possible to overcome the drawbacks of the prior art. More particularly, it supplies a charging device for a motor-driven machine (and in particular for a vehicle) which can be connected to essentially any system for connecting to the electrical network, and which can charge batteries at high power when said power is available.

This is accomplished by providing a first AC/DC converter which can operate, in a first configuration, with a single-phase input current and, in a second configuration, with a multi-phase input current; and by adding a switching module which can switch the converter in the first configuration or in the second configuration.

In other words, the charging device according to the invention has a universal input, and it can be connected to both multi-phase and single-phase power sources.

DESCRIPTION OF EMBODIMENTS OF THE INVENTION

The invention is now described in greater detail and in a non-limiting manner in the following description.

Figure 1:
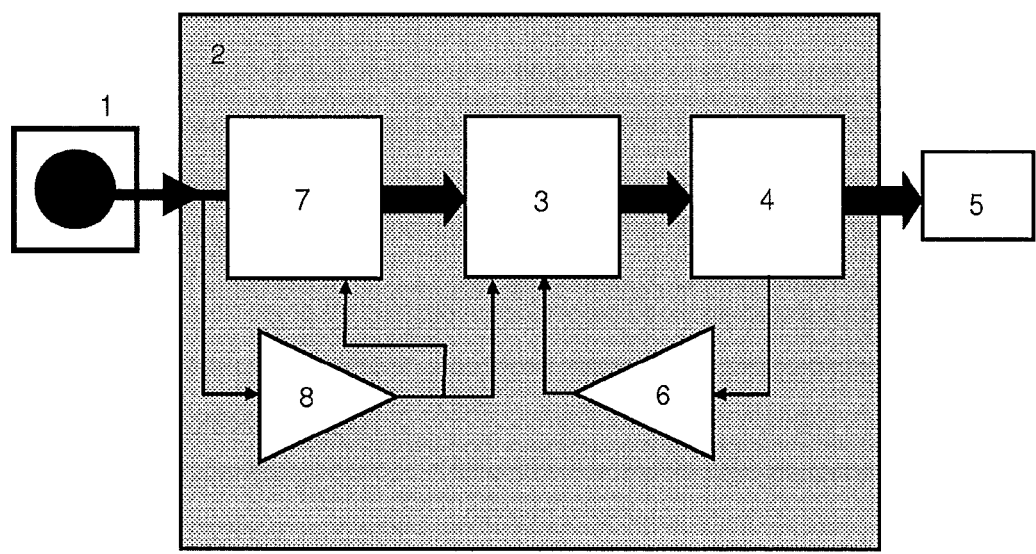
FIG. 1 is a schematic view of a charging device according to an embodiment of the invention.

With reference to FIG. 1, a charging device 2 is intended to charge a battery 5 of a motor-driven machine. This device can either be integrated in the motor-driven machine, or in a charging system which is outside the motor-driven machine, or can even be autonomous. The battery 5 can be charged by (can supply) a direct current referred to as an output current.

According to a preferred embodiment, the motor-driven machine is a vehicle, in particular a motor vehicle, powered by electricity. In other embodiments, the motor-driven machine can be a handling machine such as a lift truck, a cherry picker, or a palette truck.

The battery 5 shows the traction battery of the vehicle (or of the machine), i.e. the battery responsible for powering the motor of the vehicle (or of the machine). It is understood that this battery 5 can represent a single battery or a battery pack.

The value of the voltage of the output current (output voltage) is generally from 20 to 550 V, preferably from 24 to 500 V.

When the battery 5 is being charged, the output voltage can vary for example between extreme values of 300 V and 500 V.

The charging device 2 comprises a first conversion module 3 and a second conversion module 4.

The first conversion module 3 can convert an alternating supply current (input current) into at least one direct current referred to as intermediate. In the charging mode, a supply source 1 (such as the electrical network) supplies alternating current to the first conversion module 3.

The input current can either be single-phase, for example having a voltage of from 85 to 265 V, or multi-phase. It can be in particular two-phase, for example having a voltage of from 200 to 250 V, or three-phase, for example having a voltage of from 380 to 420 V.

A multi-phase current is formed by several alternating (preferably sinusoidal) currents having the same frequency and the same amplitude which are mutually phase shifted.

The charging device 2 from the invention can adapt both to a single-phase input current and to a multi-phase input current. Preferably, it can adapt to both a single-phase input current and to a three-phase input current, or it can adapt to both a single-phase input current and to a two-phase input current, or it is even capable of adapting to a single-phase input current, to a two-phase input current and to a three-phase input current. In the following, a charging device 2 which can adapt to both a single-phase input current and to a three-phase input current is taken as an example—the other configurations can be deduced from this example by analogy.

The first conversion module 3 supplies direct current (referred to as intermediate current) to the second conversion module 4.

The second conversion module 4 can convert the intermediate current into the output current which powers the battery.

The first conversion module 3 preferably comprises a power factor correction (PFC) circuit in order to limit the input current harmonics. Such a circuit also has the advantage of operating over a wide range of input voltages.

A switching module 7 is provided at the input of the first conversion module 3 so that the charging device 2 can operate with input currents of a different nature. The switching module 7 is adapted to switch the first conversion module 3 between a first configuration which is adapted to a single-phase input alternating current and a second configuration which is adapted to a three-phase input alternating current.

The switching module generally comprises a set of switches, for example two-way relays and/or electromechanical relays.

According to one embodiment, the switching module 7 can be controlled directly by the operator, who chooses the first configuration or the second configuration of the first conversion module 3. However, it is preferred for the switching to be carried out automatically. For this purpose, control means 8 are provided which are adapted to detect the single-phase or three-phase nature of the input alternating current, and can control the switching device 7, to switch (i.e. swing or maintain) the first module 3 into/in the first configuration if a single-phase input alternating current has been detected, and to switch (i.e. swing or maintain) the first module 3 into/in the second configuration if a three-phase input alternating current has been detected.

The control means 8 can comprise analogue elements and/or digital elements. They can comprise a microcontroller. They are parameterable so that they can easily adapt to electrical distribution networks which are associated with various normative constraints.

Figure 2:
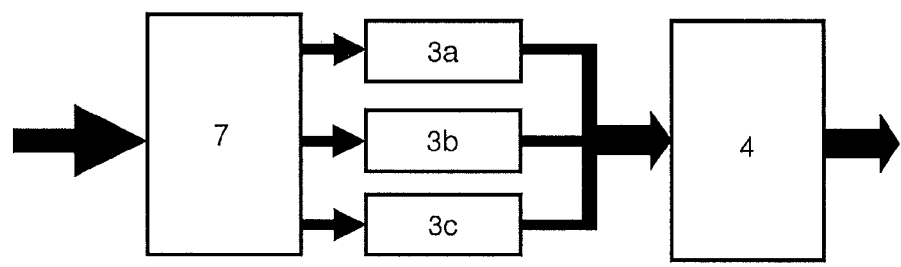
FIG. 2 is a schematic view of a detail of a charging device according to an embodiment of the invention.

With reference to FIG. 2, a possibility for using the charging device 2 consists in providing three conversion units 3a, 3b, 3c of the first module, which together form the first conversion module 3, each conversion unit 3a, 3b, 3c of the first module being adapted to convert a single-phase alternating current into a direct current. For example, each of these units 3a, 3b, 3c can comprise a single-phase PFC circuit.

In the first configuration (operation with a single-phase power supply), the switching module 7 preferably directs the single-phase input current to one of the units 3a, 3b, 3c, or it distributes the single-phase input current to two units, or preferably to the three units 3a, 3b, 3c.

In the second configuration (operation with a three-phase power supply), the switching module 7 separates the three-phase input alternating current into three individual single-phase alternating currents, and directs each of these individual single-phase alternating currents to the respective conversion units 3a, 3b, 3c of the first module.

In each of the configurations, each conversion unit 3a, 3b, 3c of the first module converts the single-phase alternating current which powers it into a direct, individual intermediate current. Then the three individual intermediate currents are summed by summation means in order to supply a total, direct intermediate current, which powers the second conversion module 4, which in this case is a single DC/DC converter.

Figure 4:
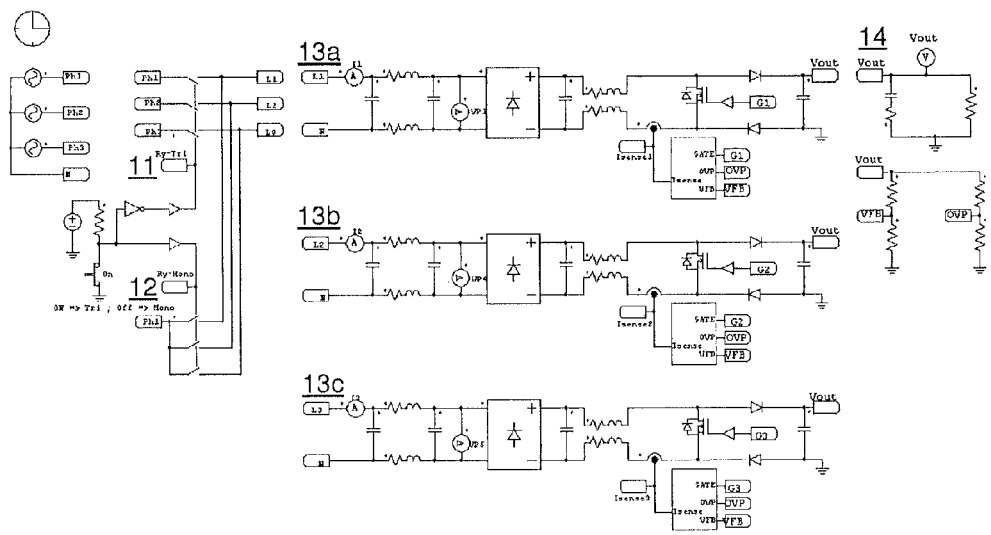
FIG. 4 is a schematic view of an electric circuit used in an embodiment of the invention.

The circuit shown in FIG. 4 is a possible example of a use of this embodiment.

This circuit comprises a relay having a three-phase position 11 and a single-phase position 12, as well as three single-phase PFC circuits 13a, 13b, 13c. When the relay is in the three-phase position 11, each phase of the three-phase input current powers a respective single-phase PFC circuit 13a, 13b, 13c. When the relay is in the single-phase position 12, the three single-phase PFC circuits 13a, 13b, 13c are powered in parallel by the single-phase input current.

The three single-phase PFC circuits 13a, 13b, 13c are connected to a common output 14 in order to supply the direct intermediate current to the second conversion module 4.

Figure 3:
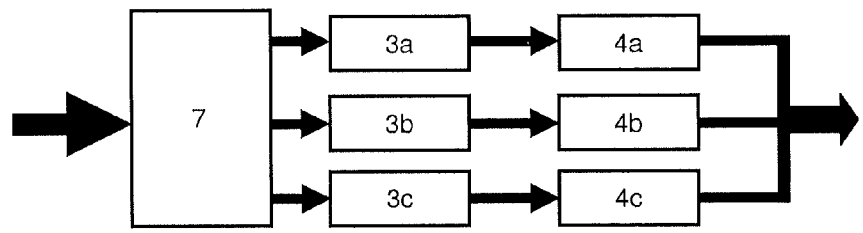
FIG. 3 is also a schematic view of a detail of a charging device according to another embodiment of the invention.

FIG. 3 shows another embodiment which is an alternative to that in FIG. 2. In this embodiment, the second conversion module 4 comprises three conversion units 4a, 4b, 4c of the second module, which each form an individual DC/DC converter. Each conversion unit 3a, 3b, 3c of the first module separately supplies an individual intermediate current to a respective conversion unit 4a, 4b, 4c of the second module.

Each conversion unit 4a, 4b, 4c of the second module supplies an individual output current, and the individual output currents are summed by summation means in order to supply the (total) output current.

According to another embodiment (not shown), the first conversion module 3 comprises a single three-phase converter which can also be used with a single-phase input current, for example a Wien bridge.

The control means 8, in addition to detecting the single-phase or three-phase nature of the input alternating current and correspondingly controlling the switching device 7, can also be adapted to adjust one or more operating parameters of the first conversion module 3, on the basis of detected parameters of the input alternating current and/or external information received.

Therefore, they can adjust a maximum intensity value of the intermediate current and/or a maximum voltage value of the intermediate current (or of the individual intermediate currents where applicable).

The detected parameters of the input alternating current may be for example a voltage value, an intensity value, a power value and/or a frequency value of the input current.

This allows an automatic adaptation of the charging device 2 on the basis of the input current, which is particularly advantageous in terms of safety. Indeed, the device can be connected to power sources having a higher or lower power, and it is therefore useful to limit the operating power as a result.

The control means 8 can also act on the first conversion module 3 on the basis of information received via one or more other channels, for example an electrical signal received via a pilot wire, or a wireless radio signal (signal transmitted by electromagnetic radiation, for example according to the Wi-Fi protocol or in the context of satellite communication), or a carrier-current signal transmitted with the input alternating current itself.

This allows external regulation of the device according to the invention, for example in order to adjust the charging power in order to ensure optimum safety conditions.

This also makes it possible to have a charging device 2 which is capable not only of operating equally well with a single-phase current as with a three-phase current, but also of operating with various possible currents in each of these categories, for example having a higher or lower voltage, intensity, power or frequency, the device therefore being completely versatile.

For example, according to the measured input voltage values, according to the number thereof, the device limits the intensity of its input current(s) to a default value, said value being set according to the applicable safety standards on the basis of the nature of the input voltage. In the case of availability of a maximum current setpoint value from the power source of the charging device (case of a device integrating the "pilot wire" or "carrier-current setpoint" function), then the maximum current is that indicated by the setpoint.

The charging device is therefore universal, since it can safely adapt to single-phase or multi-phase power sources and can adapt the maximum input current according to the number of phases, the value of the input voltages and the possible presence of an external setpoint.

The second conversion module 4 (or where applicable each conversion unit 4a, 4b, 4c of the second module) is preferably a conversion module with galvanic isolation and in particular a chopping conversion module with galvanic isolation, i.e. it comprises: a switched-mode sub-module converting the direct intermediate current into alternating current, the frequency of which is referred to as a switching frequency; a transformation sub-module, receiving said alternating current, comprising a magnetic coupling of two circuits and ensuring the galvanic isolation; and a recovery sub-module converting the alternating current from the transformation sub-module into the direct output current.

The second conversion module 4 may be for example a phase shift modulation converter or a pulse width modulation direct transfer converter (e.g. forward, push-pull, series chopper, etc.) or a resonant converter (in particular an LC- or LLC-type resonant converter).

For each given second conversion module 4, optimum operating conditions can be defined.

The invention therefore provides, according to one embodiment, a control in the form of additional control means 6 of the first conversion module 3 which are adapted to adjust the voltage of the intermediate current(s) according to the evolution of the charging of the battery 5, such that the second conversion module 4 operates in the predefined optimum conditions for practically the entire duration of the charging.

This control can be made in various ways, either according to a law of variation established on the basis of measured voltage and current conditions, or based on the measurement and the direct control of the operation of the converter 4.

More specifically, in the case of varying the voltage and/or the power of the output current as a result of the charge (battery 5), a control makes it possible to modify either the switching frequency or the cyclical switching ratio (or both), of the second conversion module 4 in order to adapt the DC/DC conversion to the new conditions imposed by the charging.

This control tends to move the second conversion module 4 away from its optimum operating conditions. A second control on the first conversion module 3 makes it possible to modify the value of the voltage of the intermediate current (s). The switching frequency and/or the cyclical ratio can therefore be returned to a setpoint value, such that the second conversion module 4 returns to its predefined optimum operating conditions.

A more detailed description of the possible additional control means 6 is shown in FR 12/00728, filed on 9 Mar. 2012.

The invention claimed is:

1. Charging device (2) for a battery (5) of a motor-driven machine adapted to be powered by a single-phase input alternating current and adapted to be powered by a multi-phase input alternating current, said charging device (2) comprising:
   a first conversion module (3);
   a second conversion module (4);
   the first conversion module (3) being adapted to convert an alternating current into at least one direct intermediate current and to supply the second conversion module (4) with said intermediate current; the second conversion module (4) being adapted to convert the intermediate current into a direct output current, and to supply the battery (5) with said output current;
   the charging device (2) further comprising:
      a switching module (7) which is adapted to switch the first conversion module (3) between a first configuration which is adapted to a single-phase input alternating current and a second configuration which is adapted to a multi-phase input alternating current.

2. Device according to claim 1, wherein the multi-phase alternating current is a three-phase alternating current.

3. Device according to claim 1, comprising control means (8) adapted to detect the single-phase or multi-phase nature of the input alternating current, and control the switching device (7).

4. Device according to claim 3, wherein the control means (8) are adapted to:
   detect one or more parameters of the input alternating current, preferably selected from a voltage value, an intensity value, a power value, a frequency value, and a combination thereof; and/or
   receive one or more pieces of external information, preferably selected from a radio signal, a carrier-current signal, an electrical signal received via a dedicated conductive line, and a combination thereof; and
   adjust one or more operating parameters of the first conversion module (3), on the basis of the detected parameters of the input alternating current and/or the external information received.

5. Device according to claim 4, wherein the adjusted operating parameters of the first conversion module (3) are selected from a maximum intensity value of the intermediate current and a maximum voltage value of the intermediate current.

6. Device according to claim 1, comprising additional control means (6) of the first conversion module (3) which are adapted to adjust the voltage of the intermediate current on the basis of operating parameters of the second conversion module (4), preferably selected from the voltage and/or the power and/or the intensity of the output current.

7. Device according to claim 1, wherein the first conversion module (3) comprises at least one power factor correction circuit.

8. Device according to claim 1, wherein the first conversion module (3) comprises a plurality of conversion units (3a, 3b, 3c) of the first module, each conversion unit (3a, 3b, 3c) of the first module being adapted to convert a single-phase alternating current into a direct current, and the switching module (7) being adapted, in the second configuration, to separate the multi-phase input alternating current into single-phase alternating currents, and to supply the conversion units (3a, 3b, 3c) of the first module with these respective single-phase alternating currents.

9. Device according to claim 8, wherein each of the conversion units (3a, 3b, 3c) of the first module is adapted to supply an individual intermediate current, and wherein:
summation means are adapted to sum the individual intermediate currents to supply a total intermediate current powering the second conversion module (4); or
the second conversion module (4) comprises conversion units (4a, 4b, 4c) of the second module, each unit being powered by an individual intermediate current from one of the respective conversion units (3a, 3b, 3c) of the first module.

10. Device according to claim 1, which is adapted to be mounted on the motor-driven machine.

11. Device according to claim 1, which is adapted to be connected to the motor-driven machine on the outside thereof.

12. Device according to claim 1, wherein the motor-driven machine is a vehicle, preferably a motor vehicle powered by electricity.

13. Method for charging a battery of a motor-driven machine using the charging device of claim 1, comprising:
supplying a single-phase or multi-phase input alternating current;
switching the first conversion module between the first configuration which is adapted to a single-phase alternating current and the second configuration which is adapted to a multi-phase alternating current;
converting the input alternating current into at least one direct intermediate current, in the first conversion module;
converting the intermediate current into a direct output current in the second conversion module; and
powering the battery with the output current.

14. Method according to claim 13, wherein the multi-phase alternating current is a three-phase alternating current.

15. Method according to claim 13, comprising detecting the single-phase or multi-phase nature of the input alternating current, the switching of the first conversion module being carried out on the basis of the detected nature of the input alternating current.

16. Method according to claim 13, comprising:
detecting one or more parameters of the input alternating current, preferably selected from a voltage value, an intensity value, a power value, a frequency value, and a combination thereof; and/or
receiving one or more pieces of external information, preferably selected from an electromagnetic radiation signal, a carrier-current signal, an electrical signal received via a dedicated conductive line, and a combination thereof; and
adjusting one or more parameters of the conversion of the input alternating current into intermediate current on the basis of the detected parameters of the input alternating current and/or the external information received.

17. Method according to claim 16, wherein the parameters of the conversion of the input alternating current into intermediate current which are adjusted are selected from a maximum intensity value of the intermediate current and a maximum voltage value of the intermediate current.

18. Method according to claim 13, comprising adjusting the voltage of the intermediate current on the basis of parameters of the output current, preferably selected from the voltage and/or the power and/or the intensity of the output current.

19. Method according to claim 13, wherein, when the first conversion module (3) is in the second configuration, the multi-phase input alternating current is separated into single-phase alternating currents, and each single-phase alternating current is converted into a direct individual intermediate current.

20. Method according to claim 19, wherein the individual intermediate currents are added together to form a total intermediate current, the total intermediate current being converted into the output current; or wherein each individual intermediate current is converted into a direct individual output current, the individual output currents being added together to form a total output current.

21. Method according to claim 13, wherein the motor-driven machine is a vehicle, preferably a motor vehicle powered by electricity.

22. Motor-driven machine comprising the charging device (2) according to claim 1, as well as the battery (5), the motor-driven machine preferably being a vehicle, and more particularly preferably a motor vehicle powered by electricity.

* * * * *